United States Patent [19]
Lindsey

[11] 3,964,426
[45] June 22, 1976

[54] WIND DRIVEN MECHANICAL DRIVE

[76] Inventor: Fred C. Lindsey, 1100 Carrington Ave., South Milwaukee, Wis. 53272

[22] Filed: Mar. 24, 1975

[21] Appl. No.: 561,553

[52] U.S. Cl. ................................ 115/3; 115/1 C; 416/121
[51] Int. Cl.² ........................................ B63H 13/00
[58] Field of Search ................. 115/1 C, 3, 18, 17; 416/121

[56] References Cited
UNITED STATES PATENTS

| | | | |
|---|---|---|---|
| 1,471,870 | 10/1923 | Tust | 115/3 |
| 2,326,757 | 8/1943 | Casiple | 115/3 |
| 2,496,434 | 2/1950 | Bosma | 115/17 |

FOREIGN PATENTS OR APPLICATIONS

| | | | |
|---|---|---|---|
| 548,307 | 1/1923 | France | 115/3 |
| 497,312 | 12/1919 | France | 115/3 |
| 265,203 | 5/1929 | Italy | 115/3 |
| 2,432 | 11/1854 | United Kingdom | 115/3 |
| 205,090 | 5/1924 | United Kingdom | 115/3 |

Primary Examiner—Trygve M. Blix
Assistant Examiner—Jesus D. Sotelo
Attorney, Agent, or Firm—Alter and Weiss

[57] ABSTRACT

A mechanical drive actuated by wind has propellers rotatably mounted on a vertical standard which is rotatably fastened to the deck of a ship. The rotational force of the propellers is transmitted by a series of shafts to drive the ship's screw. The vertical standard may be rotated to take full advantage of the prevailing winds.

5 Claims, 10 Drawing Figures

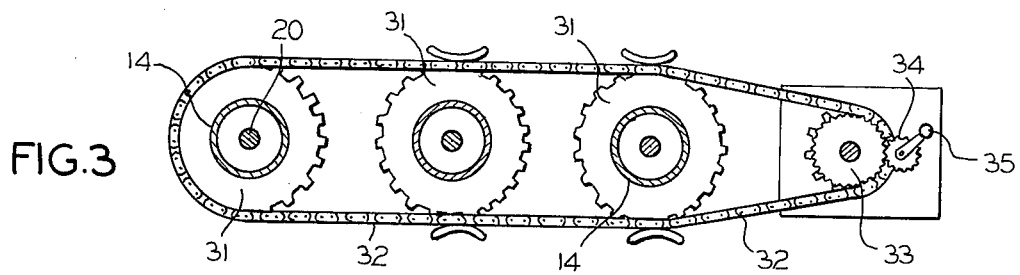
FIG.3
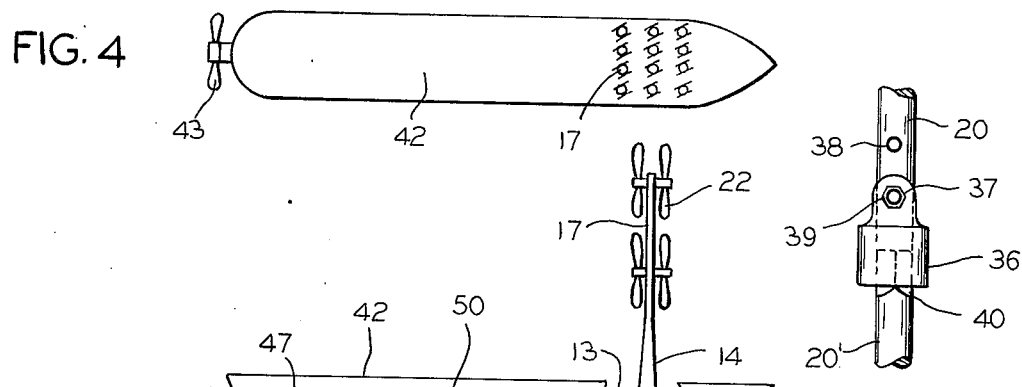
FIG.4
FIG.5
FIG.10
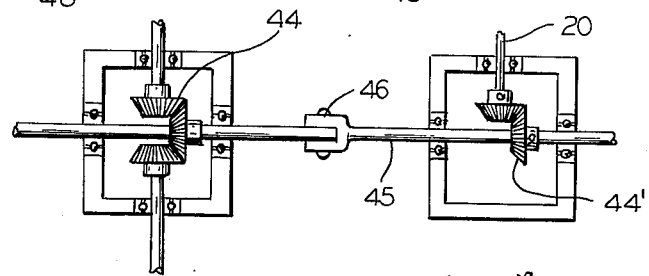
FIG.6
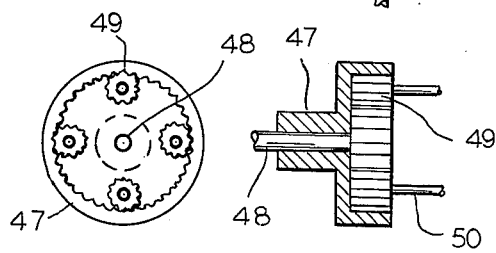
FIG.7  FIG.8
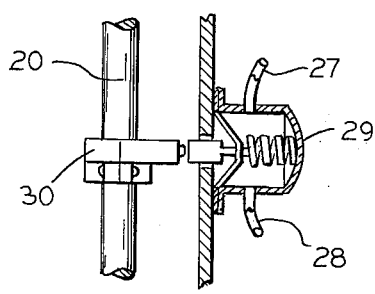
FIG.9

WIND DRIVEN MECHANICAL DRIVE

My invention relates, generally, to wind powered engines and more particularly to a mechanical drive actuated by propeller means for actuating the screw of a ship.

The prime object of my invention is to provide devices that consist of propeller means rotatably mounted on a rotatably adjustable vertical standard for driving the screw shaft of a ship or the like.

Another object is to provide a device that will entirely eliminate the need for sails on wind driven ships as a means of propulsion and maneuvering.

A further object is to propel a wind driven ship using a single mechanism controlled by an easily manually manipulated lever.

A further object is to employ a plurality of mechanically controlled vertical standards supporting a multiplicity of propellers to enable a wind driven ship or the like, to be propelled in any direction, including straight into the wind, eliminating the need for tacking.

It is obvious to anyone familiar with the manipulation of a sail boat that to control the speed and direction of a sailboat, it is necessary to manipulate the boom and the rudder, operations which must be carried out frequently as the wind shifts. My invention eliminates both the necessity for the boom and for the complex system of ropes and tackle used to control it.

A plurality of propellers may be mounted on a vertical standard, or tower, and a multiplicity of vertical standards may be mounted as space permits and power requirements demand. One easily-adjusted control simultaneously determines the angle of rotation of all vertical standards, so that all propellers remain facing the same direction.

Use of the invention described herein is not limited to sail boats. It may be applied for use in actuating hydraulic generators, turbines and the like: the principle involved being use of the wind to revolve and control the unit being actuated.

The nature of a preferred embodiment of the invention will be understood best from a study of the attached drawings, in which:

FIG. 3 is a schematic top view of a plurality of towers, illustrating a method for simultaneously controlling them to face the same direction.

FIG. 4 is a top view of a ship, showing a plurality of towers arranged in rows, laterally disposed.

FIG. 5 is a schematic cross-sectional view of a ship equipped with a tower, showing a means for transmitting the rotation of the propellers to the ship's screw.

FIG. 6 is a schematic view of a means to connect together horizontal shafts from individual towers.

FIG. 7 is a suggested multiple drive, with a plurality of shafts driven by an internal gear.

FIG. 8 is a cross-sectional view of the drive arrangement shown in FIG. 7.

FIG. 9 is a cross-sectional view of a pump arrangement driven by an eccentric unit mounted on the vertical standard, used to supply lubrication to the mechanism within the vertical standard.

FIG. 10 is a view of a suggested coupling, for the engagement and disengagement of shaft sections.

Figures 1, 2:
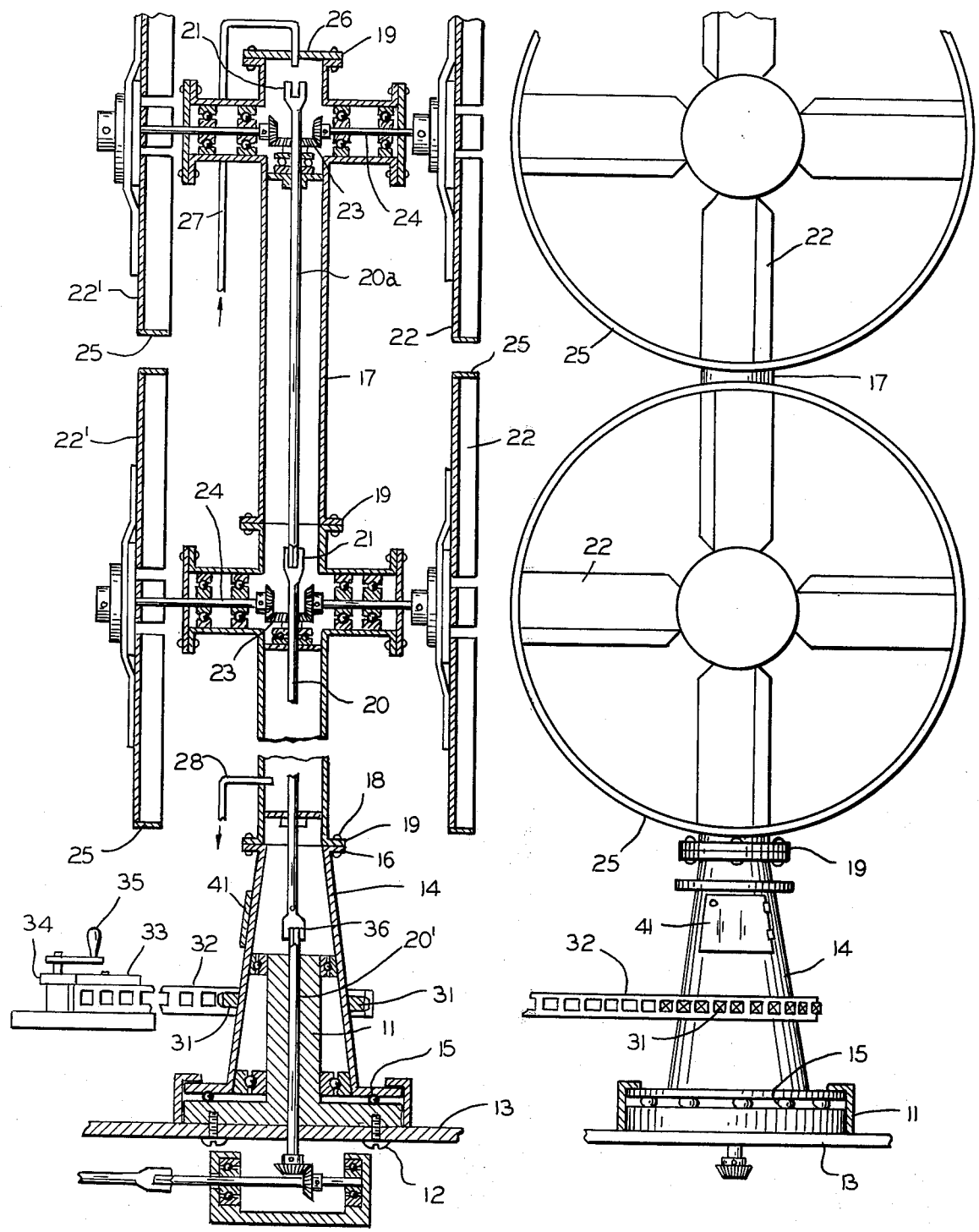
FIG. 1 is a fragmentary cross-sectional view of the entire assembled tower constituting my invention.
FIG. 2 is a front view of the tower shown in FIG. 1.

Referring now to FIGS. 1 and 2, the character 11 shows a base mounted by means of the screws 12, to the deck board 13 of a ship in any convenient and efficient manner.

A tapered casing 14 is mounted on the base 11, by means of ball-bearing 15, in any practical manner. The tapered casing 14 is equipped with a flange 16 at its top, to support a tubular casing 17, shown equipped with a lower flange 18 to enable it to be attached as shown at 19, to the flange 16 in any convenient manner.

The tapered casing 14 and the tubular casing 17 support a vertical shaft 20, at one end of which is a socket 21 having a square recess to accomodate the end of another such shaft 20a.

The vertical shaft 20a is shown equipped with bevel gears 23 for contact with the horizontal propeller shafts 24 which are connected to the propellers 22 and 22'. The number of propeller vanes may vary and be of any conventional design, and the propellers may be mounted singly or in tandem, as shown at 22'. The propeller blades 22 may be supported by a band 25 on their outer peripheries as shown in FIG. 2, to stiffen blades 22 and to eliminate any flutter of said blades in the wind.

The tubular casing 17 is closed off by the plate 26 at its top, which plate is equipped with an aperture to accomodate the tube 27. A similar tube 28 is fitted to an aperture on the lateral portion of the tubular casing 17. Said tubes 27 and 28 originate at a pump 29 attached to the tubular casing 17 and actuated by an eccentric collar 30 (See FIG. 9), attached to the vertical shaft 20. Said pump 29 is used to circulate oil for lubricating the gears at 23. Obviously the pump and its actuation may be of any conventional and practical design.

Angular adjustment of the towers to head the propellers 22 into the wind and to place the propellers 22 in relation to one another, is accomplished by the gear-type teeth 31 (See FIGS. 1, 2, and 3). The teeth 31 are revolved and rotate the tower by means of the chain 32. In one application, the gear 33 is rotated by pinion 34 when revolved by the crank 35. The rotation of gear 33 moves chain 32 which, in turn, engages teeth 31, thereby rotating the tower.

Variations on the adjustment mechanism could include nonmanual means for rotating chain 32, such as an electric motor, and braking means applied to the towers to prevent over-rotation. It should be noted that, as shown in FIG. 3, a convenient means to adjust a multiplicity of towers as in FIG. 4 would be to provide a separate control means for each row of towers. Controls for such towers could be grouped closely together, making nearsimultaneous adjustment of all towers possible.

The vertical shaft 20 is equipped with a joint connector 36 shown in detail in FIG. 10, which is supported by the bolt 37 engaging one or the other of the apertures 38 and 39. The lower portion 20' of the shaft 20 is finished at its upper end with a square tip 40. When the bolt 37 is secured through the lower aperture 39, the joint connector 36 is in its lowest position and so engages the square tip 40 of the shaft section 20'. To disengage the shaft section 20', the bolt 37 is removed and the joint connector 36 is moved to its raised position, at which point the bolt 37 is inserted through the aperture 38. A hinged door opening 41 affords access to the joint connector 36.

FIG. 5 is a schematic drawing showing the installation of the tower on a boat indicated generally as 42, and a suggested linkage 50 to transmit the motion of the propellers 22 to the ship's screw 43. As herein used, the term "screw" refers to the propeller or propellers whose rotation, in contact with the water, provides the drive impetus to the ship. FIG. 6 depicts a suggested method for transmitting the motion of a plurality of vertical shafts 20 to a horizontal shaft 45 connected by means of a socket 46.

The suggested arrangements shown in FIGS. 7 and 8 depict the internal gear unit 47 used for driving the ship's screw shaft 48 with the plurality of pinions 49 on the shafts 50.

It is apparent from the above description that using propellers to drive vertical shafts which may be arranged in any number, and controlling all such vertical shafts with a single manual control, simplifies the operation of a windpowered boat. It is also obvious that the above described drive arrangement may be applied to other similar uses.

While the principles of the invention have been described above in connection with specific apparatus and applications, it is to be understood that this description is made only by way of example and not as a limitation on the scope of the invention.

I claim:

1. Apparatus for using wind to actuate the screw shaft of a ship, comprising:
    a vertical standard rotatably fastened to said ship;
    a plurality of propellers,
    said propellers being rotatably supported by said vertical standard,
    said propellers arranged on said vertical standard in tandemly mounted, oppositely disposed pairs,
    each said propeller supported about its outer periphery by a band,
    said band being circular in configuration;
    transmitting means to transmit the rotary motion of said propellers to said screw shaft, said transmitting means including a plurality of vertical shafts mounted coaxially within said vertical standard,
    means for selectively interconnecting said vertical shafts,
    each of said vertical shafts adapted to transmit the rotary motion of one of said pairs of oppositely disposed propellers; and
    adjusting means for adjusting the direction in which said propellers face,
    said adjusting means being adapted to controlledly rotate said vertical standard, and including crank and pinion means, gear-type teeth integral with and disposed horizontally about the periphery of the base of said vertical standard; and chain means engaging said teeth, said chain means rotatably engaging said crank and pinion, whereby rotating said chain means with said crank and pinion means rotates said vertical standard.

2. The apparatus as recited in claim 1, wherein said vertical shafts are completely enclosed within said vertical standard.

3. Wind driven apparatus for using wind to activate the screw shaft of a ship, comprising:
    a plurality of propellers,
    said propellers being arranged in oppositely disposed pairs;
    a plurality of vertical standards rotatably mounted to the deck of said ship,
    said pairs of propellers rotatably supported by said vertical standards,
    said propellers in each said pair disposed on opposite sides of one of said plurality of vertical standards;
    transmitting means to transmit the rotary motion of said propellers to said screw shaft,
    said transmitting means including a plurality of selectively interconnectable vertical shafts, with each of said vertical shafts transmitting the rotary motion of one of said pairs of propellers; and
    means for simultaneously adjusting the rotation of said vertical standards; wherein said adjusting means comprises crank and pinion means, gear-type teeth integral with and horizontally disposed about the periphery of the base of each of said vertical standards, and chain means simultaneously engaging said teeth on each of said vertical standards, said chain means being connected to said crank and pinion means, whereby rotation of said crank and pinion means simultaneously rotates said vertical standards.

4. The apparatus as recited in claim 3, wherein each of said propellers is supported at their outer peripheries by a band,
    said band having a circular hoop-like configuration.

5. The apparatus as recited in claim 3, wherein said vertical shafts are completely enclosed within said vertical standards.

* * * * *